April 26, 1932.   O. ONSRUD   1,855,528
AUTOMATIC SHAPER
Filed Jan. 2, 1931    8 Sheets-Sheet 1

Witness
Arthur M. Framke.

Inventor
Oscar Onsrud
Rummler, Rummler,
Woodworth Attys.

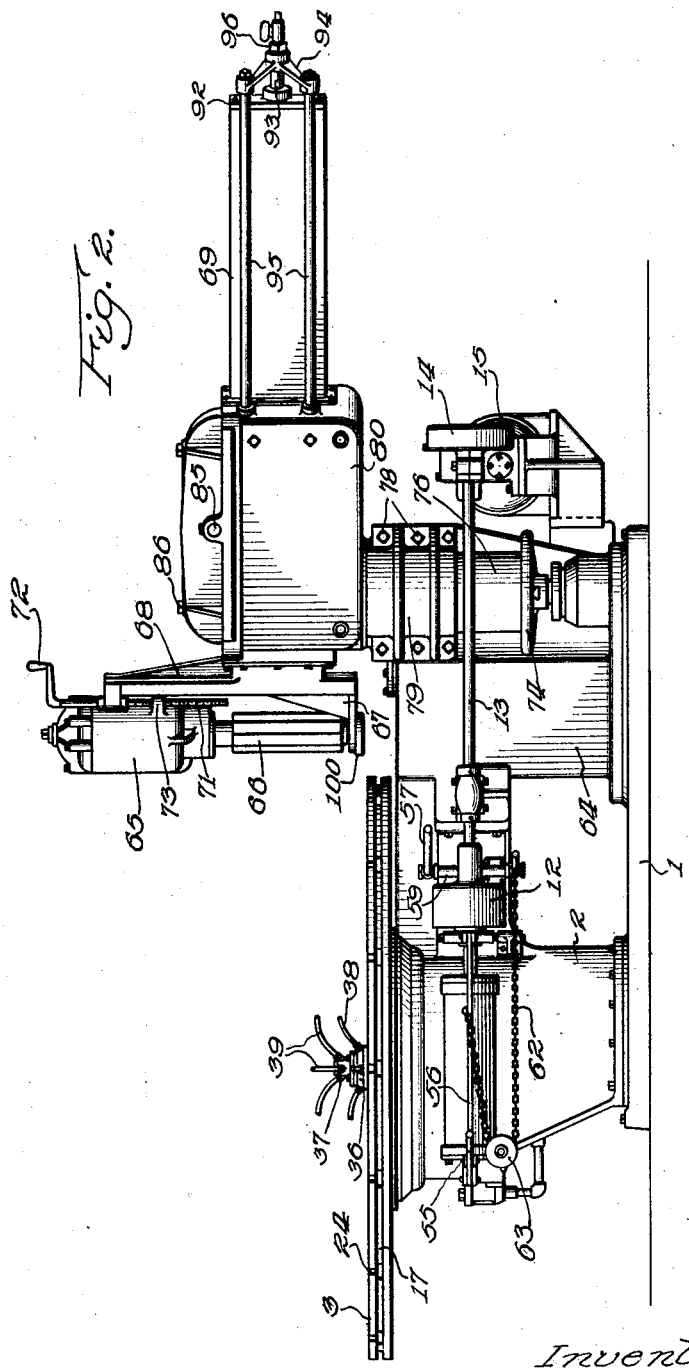

April 26, 1932. O. ONSRUD 1,855,528
AUTOMATIC SHAPER
Filed Jan. 2, 1931 8 Sheets-Sheet 3
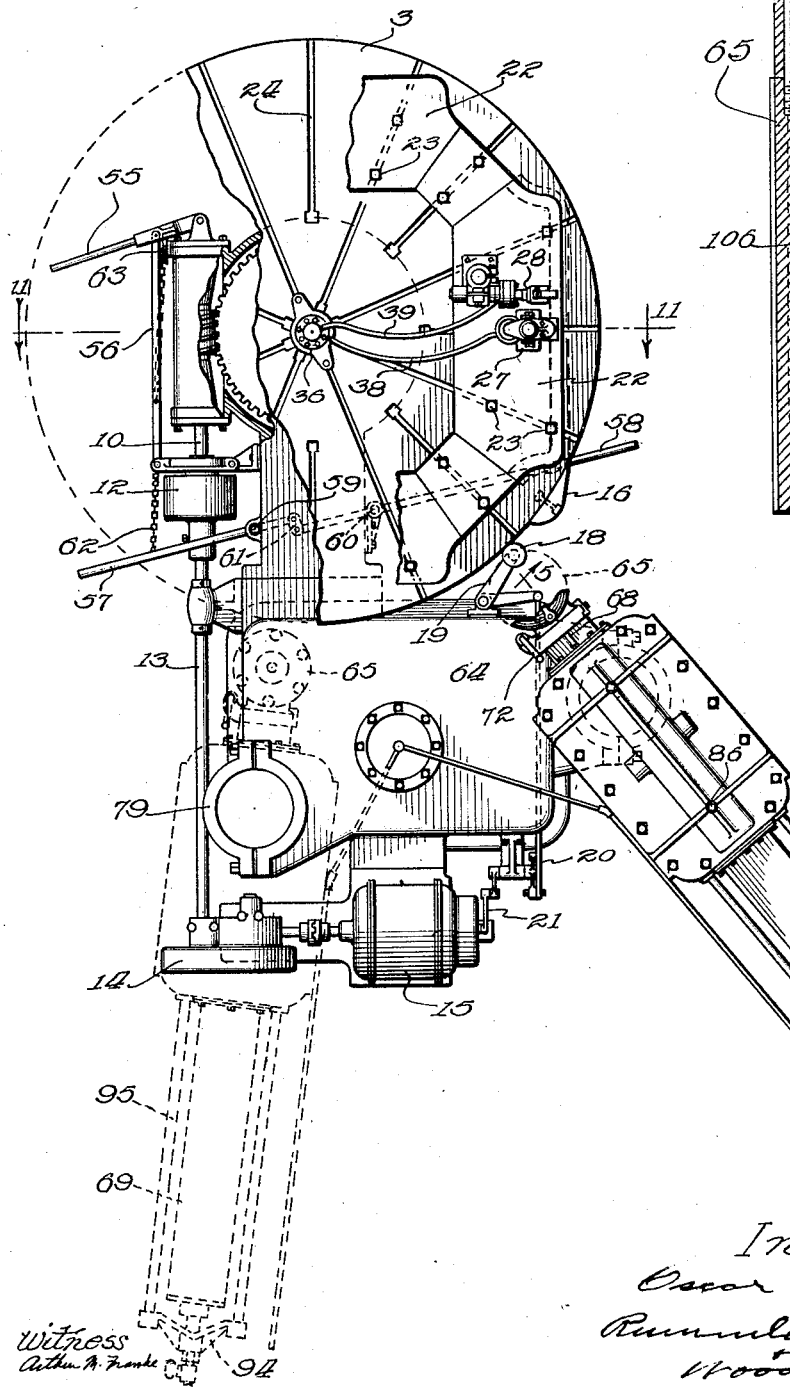

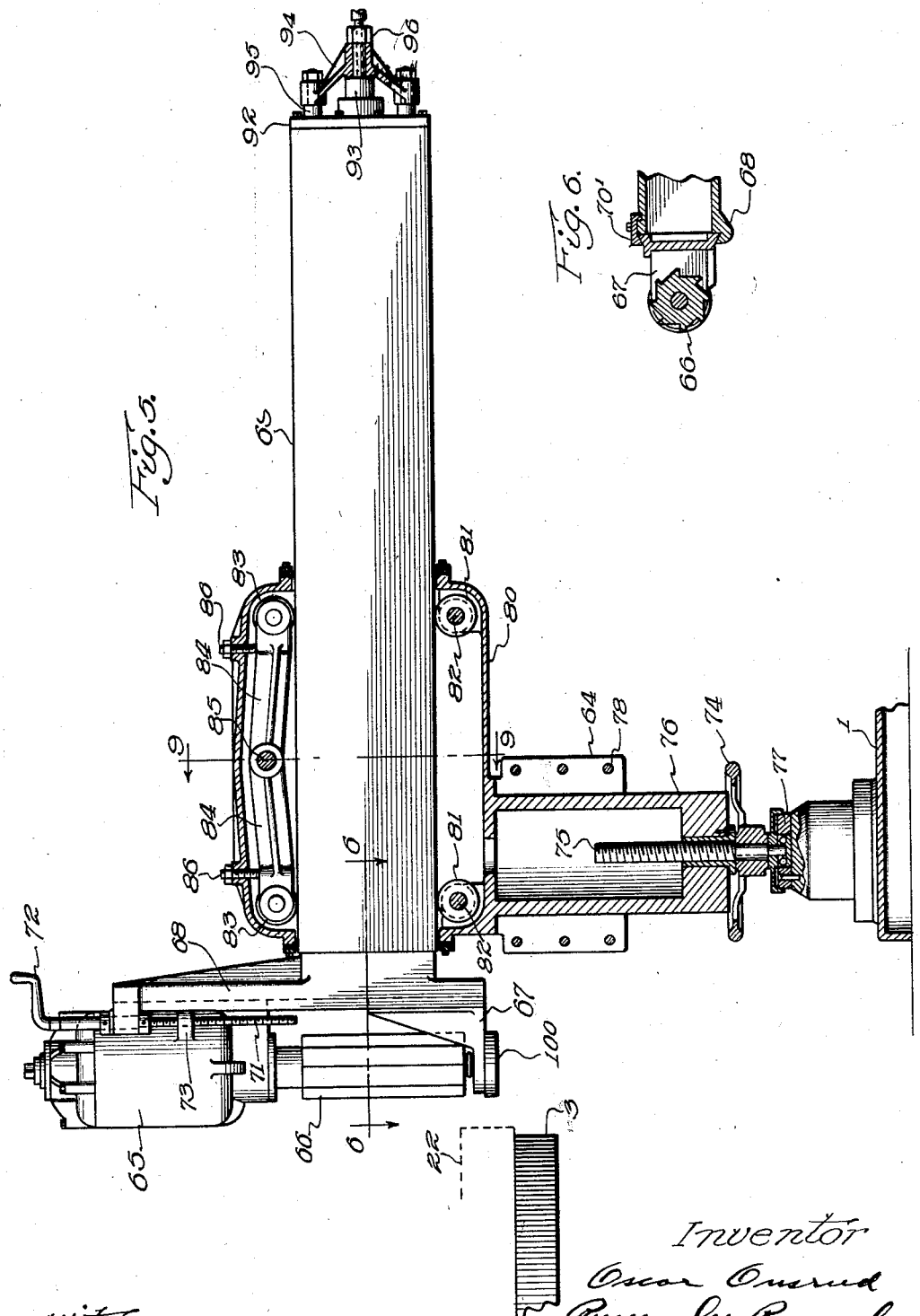

April 26, 1932.  O. ONSRUD  1,855,528
AUTOMATIC SHAPER
Filed Jan. 2, 1931   8 Sheets-Sheet 5
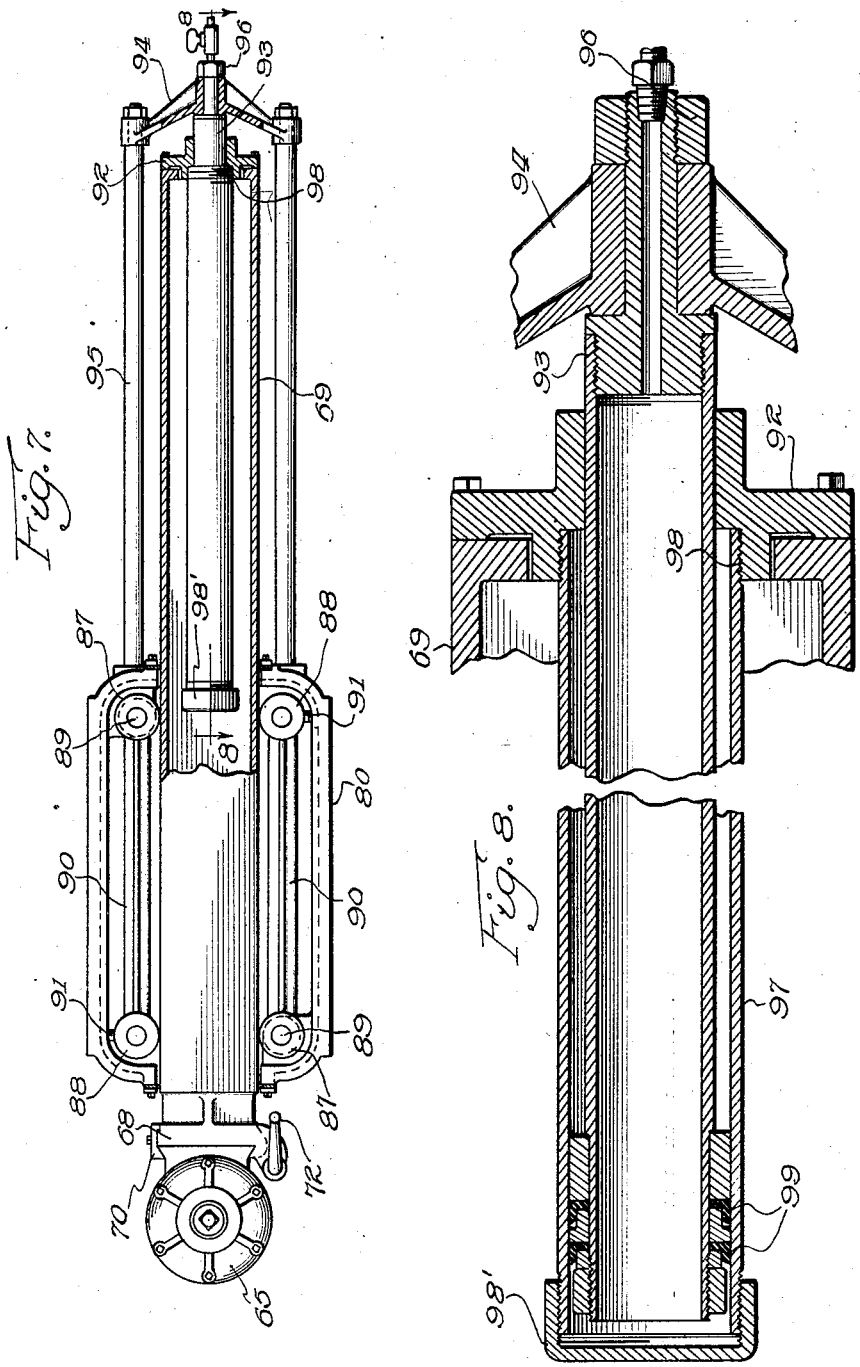
Witness
Arthur M. Franke.
Inventor
Oscar Onsrud
Rummler, Rummler
& Woodworth Attys.

April 26, 1932.                    O. ONSRUD                    1,855,528
                              AUTOMATIC SHAPER
                        Filed Jan. 2, 1931      8 Sheets-Sheet 6
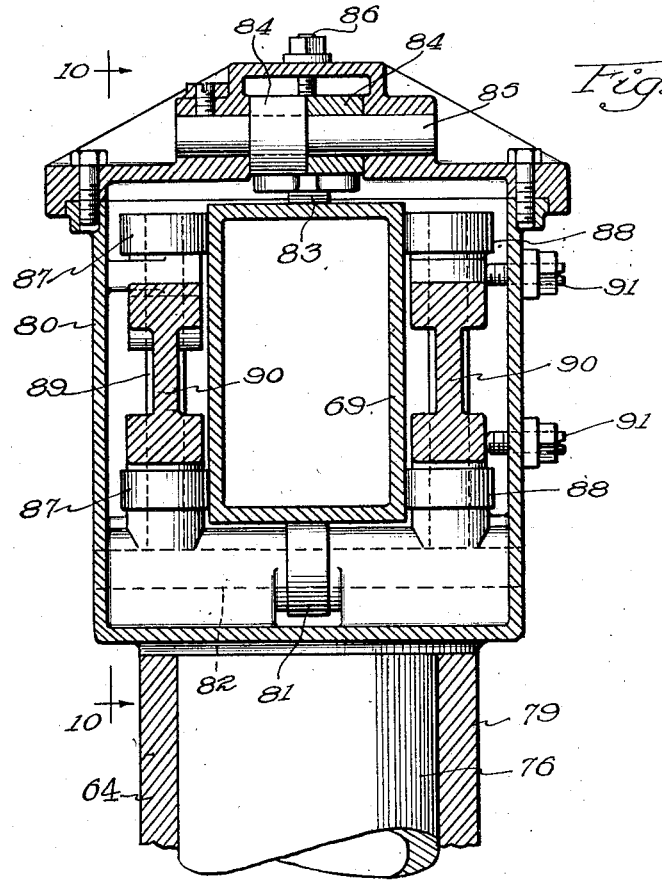
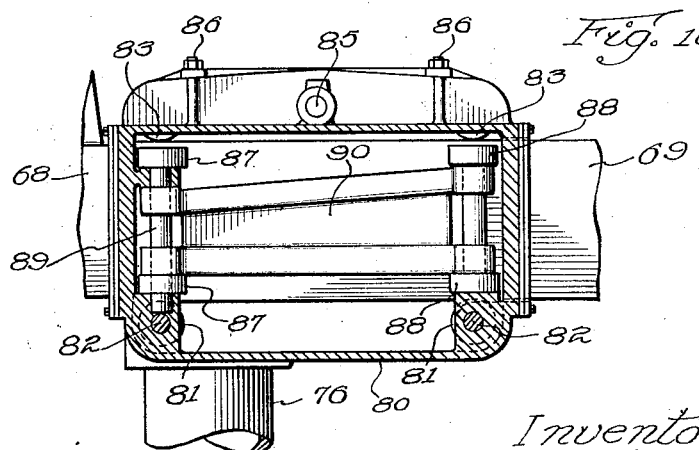

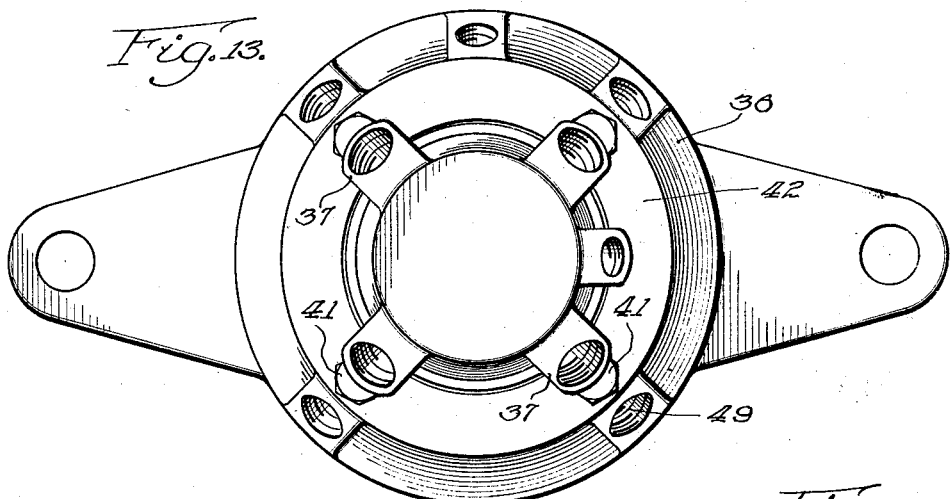
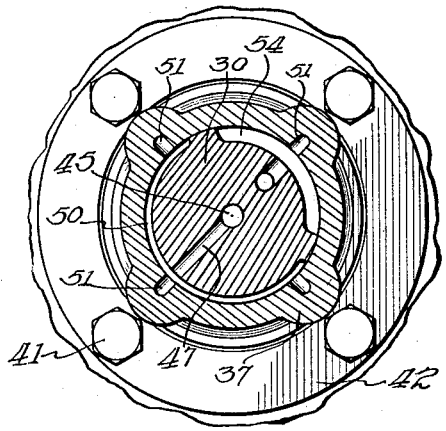
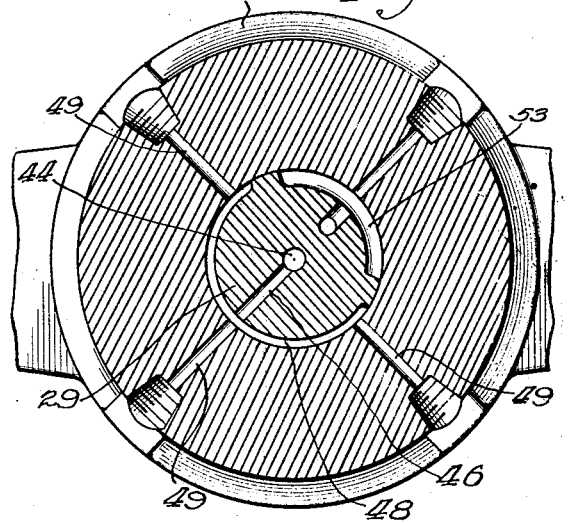
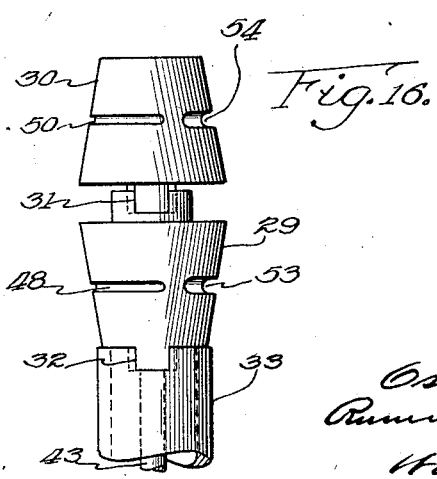

Patented Apr. 26, 1932

1,855,528

UNITED STATES PATENT OFFICE

OSCAR ONSRUD, OF CHICAGO, ILLINOIS, ASSIGNOR TO ONSRUD MACHINE WORKS, INC., OF CHICAGO, ILLINOIS, A CORPORATION OF ILLINOIS

AUTOMATIC SHAPER

Application filed January 2, 1931. Serial No. 506,134.

This invention relates to shaping machines particularly designed for working wood, and of the same general character as the wood-working machine described in patents to Oscar Onsrud, Nos. 1,685,572, September 25, 1928; 1,685,613, September 25, 1928; and 1,715,380, June 4, 1929.

The objects of the invention are to provide improvements in the general arrangement and details of the type of machine mentioned, including an improved pneumatic ram construction for shifting tool carrying and driving units radially with reference to a rotating table which supports the articles operated upon, improvements in tool mounting providing upper and lower bearings for the tool and a detachable mounting therefor suitable for right or left rotation, an improved variable speed drive means for the work supporting table, a clutch having a safety throwout automatically operable in case of accident, for either right or left rotation of the work supporting table, pneumatic means in this type of machine for automatically correctly positioning work on the work supporting table prior to clamping the work in such position for engagement with the cutting tool, and to provide an improved valve construction for controlling the time of action of the pneumatically operated work positioning and clamping devices.

The objects of the invention are accomplished by means of a construction as illustrated, in which:

Fig. 2 is an elevational view of the machine taken from the opposite side of that shown in Fig. 1.

Fig. 3 is a plan view of the machine partly broken away and with one of the cutter operating units shown by broken lines.

Fig. 4 is a vertical, sectional view showing the motor for driving one of the cutters to illustrate the spindle connection and bearings therefor.

Fig. 5 is a side view of one of the tool supporting units including a pneumatic ram for resiliently urging the unit toward the work to be operated upon, the adjustable supporting structure therefore being shown in section, taken on the line 5—5 of Fig. 3.

Fig. 6 is a sectional detail through the cutter taken on the line 6—6 of Fig. 5.

Fig. 7 is a plan view partly in section of the pneumatic ram and cutter unit carried thereby.

Fig. 8 is an enlarged sectional detail partly broken away, taken on the line 8—8 of Fig. 7.

Fig. 9 is an enlarged transverse vertical section taken on the line 9—9 of Fig. 5.

Fig. 10 is a side view of the construction shown in Fig. 9 partly in section along the line 10—10 of Fig. 9.

Fig. 13 is a plan view of the valve construction shown in Fig. 12.

Fig. 14 is a horizontal, sectional view taken on the line 14—14 of Fig. 12.

Fig. 15 is a horizontal, sectional view taken on the line 15—15 of Fig. 12.

Fig. 16 is a side view of the stationary core element of the valve.

The improved machine consists mainly, in a supporting base having mounted thereon a circular work supporting table and its drive, and separate tool operating units with independent drives, including pneumatic means for resiliently urging the tool units radially over and toward the center of the horizontally disposed rotary work supporting table. The radial position of the cutting tools when the machine is in operation is determined by patterns carried by the table, and over which the articles operated upon are secured. Each cutting unit has its own motor drive, and the speed of the tools is constant, but the table has a variable speed drive which is under the control of cams adjustable along the periphery of the table, whereby when the angle of the cut on the work changes, the speed of the table may change accordingly.

The radially shiftable cutting units are employed for successively performing different operations on the same article.

In the use of the machine, the articles to be operated upon are placed by hand in approximately the correct position on the work supporting table, but before the article is engaged by one of the cutting tools, a pneumatic device grips it and draws it against stops, bringing it exactly to correct position with reference to the cutting tools, and separate pneumatic clamps hold the article during the cutting operation.

Figure 11:
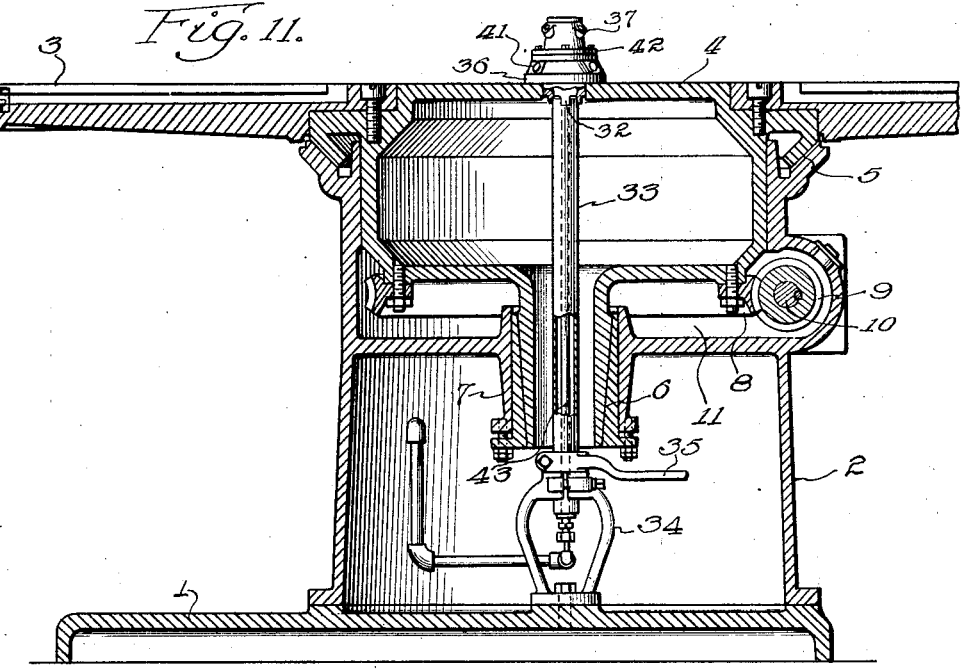
Fig. 11 is an enlarged vertical sectional view of the work supporting table taken on the line 11—11 of Fig. 3.
Figure 12:
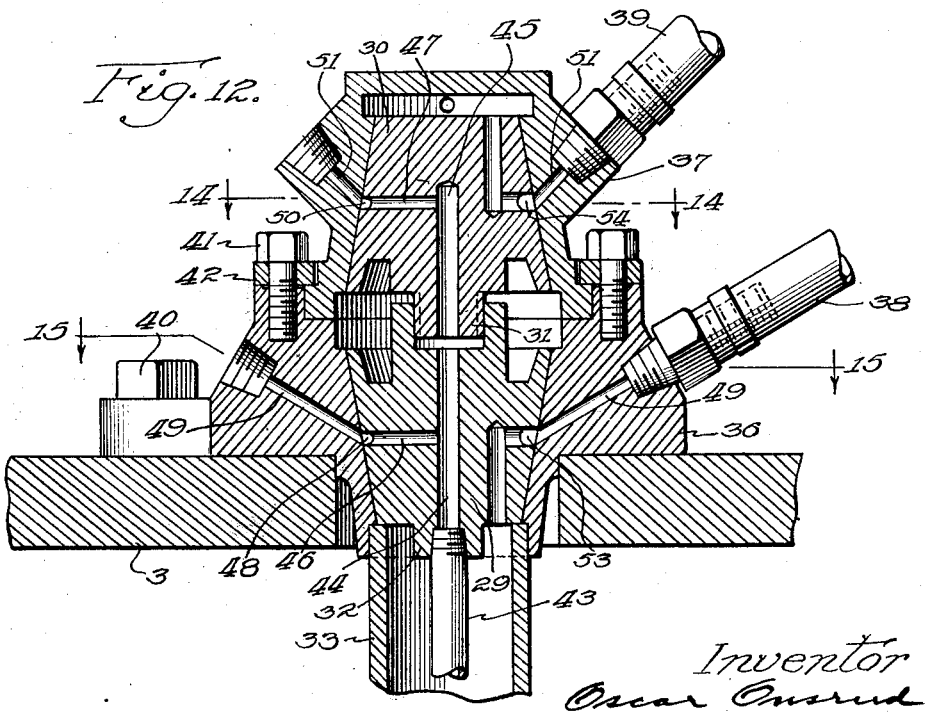
Fig. 12 is an enlarged vertical sectional view of a valve mechanism centrally located upon the work supporting table and for controlling the operation of pneumatic work adjusting and clamping devices carried by the table.

Having reference to the drawings, the machine is shown as comprising a supporting base 1 having a table supporting pedestal 2 upon which is rotatably mounted the work supporting table 3 constructed as illustrated in Fig. 11 to include a center hollow casting 4 fitting within the pedestal 2 and resting upon the inclined bearing 5 and having the central journal 6 fitting within the bearing 7 on the pedestal 2. The casting 4 carries a worm wheel 8 meshing with a worm 9 on the drive shaft 10. The pedestal 2 is formed to surround the work and worm wheel to provide the space 11 for a lubricant. As indicated in Fig. 3, a clutch 12 connects shaft 10 with shaft 13 which is driven by a right angle drive located in the gear housing 14 and which receives power from the electric motor 15.

The rate of rotation of the work supporting table 3 is varied according to the form of the articles operated upon, which are carried by the table, in order that a constant speed cutter may be equally effective during its operation regardless of changes in the angle of the surface operated upon. The change in the speed of the motor is effected by automatically adjusting the brushes thereon by means of cams 16 which are attached to the periphery of table 3 and may be adjusted therealong by means of headed adjusting screws fitting within an annular T-slot 17 cut in the edge of the table as shown in Fig. 11.

Figure 1:
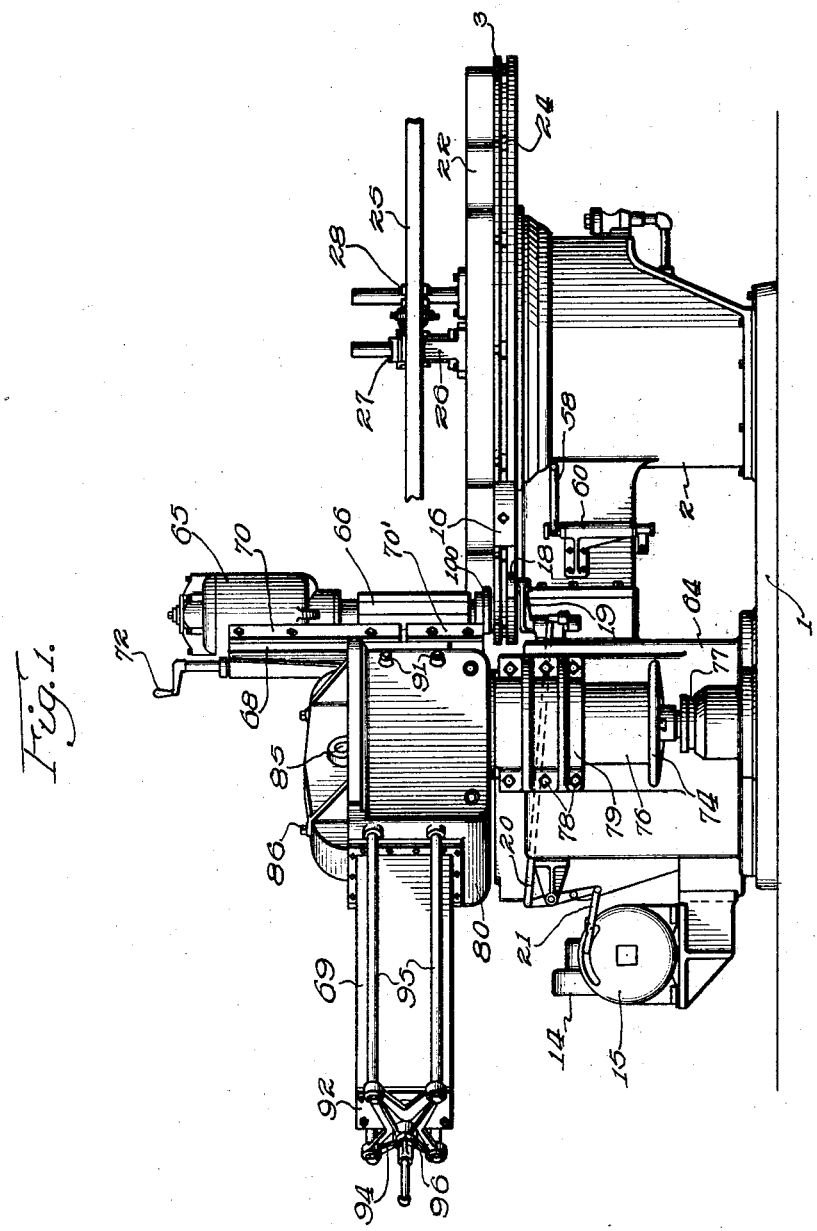
Figure 1 is a side elevation of the improved machine.

The roller 18 carried at the end of an arm 19 is in line of movement of cams 16 and, when rocked outwardly thereby, the motion of the roller is transmitted through linkage 20 to a motor brush adjusting arm 21, Fig. 1. By changing the pivotal connections of link 20, the brush adjustment may be reversed to meet conditions when the direction of rotation of table 3 is changed, the motor 15 being reversible for this purpose.

The work supporting table carries removable patterns 22 which are secured to the table by the bolts 23 projecting upwardly from the radial T-slots 24 in the table. Articles of work as roughly indicated at 25 are supported above the patterns 22 on the blocks 26 secured to the patterns. The articles of work are placed in position while the table is rotating and pneumatic clamps 27, Fig. 3, securely hold the articles while the same are being operated upon by the cutting tools, but preliminary to the clamping operation of clamps 27 pneumatic work adjusting members 28 operate to adjust the work to exactly the correct position for engagement therewith of the cutting tools. The clamps are described in patent to Onsrud No. 1,685,613, September 25, 1928, and the pneumatic work adjusting devices are described in the application for patent of Oscar Onsrud, Serial No. 497,470, filed November 22, 1930.

Improved control means for the work adjusting and clamping devices are shown in Figs. 12–16 inclusive and consist of a valve core formed of the two parts 29 and 30 which are secured together against relative rotation by the joint 31, Fig. 16. The valve core structure is similarly secured at 32 to a tube 33. This tube is supported at its lower end by a bearing member 34, Fig. 11, and carries a handle 35 by means of which it may be adjusted within its bearing to effect the desired setting of the valve core.

The core is relatively stationary to the surrounding valve members 36 and 37, respectively, having conduit connections 38 and 39 to the work gripping and adjusting devices 27 and 28. The valve member 36 is clamped to table 3 by the bolts 40 and the valve member 37 is adjustably secured on the member 36 by bolts 41 passing through the clamping rings 42. This adjustment is provided to enable regulation of the time of action of the work adjusting devices 28 in advance of the work clamps 27. The adjustment of the core of the valve by means of handle 35 is for advancing or retarding the action of the work adjusting and gripping devices in unison. Air is admitted to the valve core through the central pipe 43 and passes upwardly through the central passageways 44 and 45 in the core elements to the radial passageways 46 and 47. The passageway 46 communicates with a groove 48 passing part way around the core element 29. The groove 48 communicates simultaneously with a plurality of radial passageways 49 during the rotation of the surrounding valve structure in order that a plurality of the clamps 27 may be rendered effective the desired length of angular travel of the table 3 during each rotation thereof. Likewise, the radial passageway 47 communicates with a groove 50 in the core member 30, from which the compressed air passes through conduits 39 to the work adjusting devices 28. Air is exhausted from the clamps 27 and gripping devices 28 through conduits 38 and 39 as the passageways 49 and 51 in communication therewith register with the grooves 53 and 54 in the valve core. In this manner, after the cutting tools have performed their work, the articles operated upon are released and may be removed.

The clutch 12, Figs. 2 and 3, may be controlled by a lever 55 to stop rotation of the table 3 when desired. This lever is connected to the clutch by a link 56. In order to automatically stop the rotation of the table in either direction of rotation thereof to prevent accident in case someone is caught thereby, a pair of arms 57 and 58 project outwardly from beneath the table at each side. These arms are pivoted at 59 and 60 and are linked together at 61 so that the motion of the arm 58 is transmitted to arm 57. The latter is connected by a chain 62 passing over a pulley 63 and attached at its end to the link 56. Thus if either of the arms 57 and 58 are rocked toward the end frame structure 64 the clutch will be thrown out.

The shaping machine is provided with a plurality of cutting units as indicated in Fig. 3, each of which includes an electric motor 65 for driving a cutting tool 66, Fig. 2. The motor frame and the lower tool bearing 67 are separately secured to the guide structure 68 carried at the inner end of a pneumatic ram 69 by clamping strips 70 and 70', Figs. 1 and 5. Vertical adjustment of the motor unit before it is clamped in set position, is effected by a crank handle 72 on a threaded shaft having a bearing on the member 68 and in threaded engagement with a lug 73 on the motor frame. Further vertical adjustment of the cutting units as a whole is provided by a wheel 74 (Fig. 5) keyed to the threaded vertical shaft 75 in threaded engagement with the lower end of a column member 76 forming a support for the ram and the cutting unit carried thereby. The wheel and shaft 75 are provided with a foot bearing 77 supported by the base 1. The column 76 is slidably supported in the frame structure 64 and may be clamped in its vertically adjusted position and against rotation by means of screws 78 having threaded engagement with the frame structure 64 and passing through a half-around clamping cap 79, Fig. 2.

The column 76 is integral with the hollow supporting member 80 for the ram 69. The latter rests upon bottom rollers 81 journalled upon transverse shafts 82 carried in the ram supporting member 80. The upper surface of the ram bears against rollers 83 carried by arms 84 which are pivoted on an upper central transverse shaft 85 and which are adjusted downwardly by means of screws 86, to bring the rollers 83 into exactly correct guiding position. The ram 69 is guided at its sides by rollers 87 and 88 (Figs. 7, 9 and 10). Rollers 87 are carried by fixed vertical shafts 89 and the rollers 88 are carried by arms 90 pivoted upon these shafts and adjustable inwardly by screws 91 in the supporting structure 80.

The outer end 92 of the ram is slidably supported upon the tube 93 (Fig. 8) which is supported by the spider shaped casting 94 carried by fixed rods 95 (Fig. 7) extending from the ram guide 80. Compressed air is admitted to the tube 93 through the fitting 96 at the outer end of the tube, and the inner end of the tube is open to communicate with the interior of a cylinder 97 rigid on the ram 69 and having threaded connection 98 therewith. The cylinder 97 is closed at its opposite end by a cap 98' and leakage of air between it and the tube 93 is stopped by the packings 99 carried by the tube 93. The compressed air serves to resiliently urge the ram and cutting unit carried thereby toward the center of the table, the extent of inward motion of the cutting unit is regulated by engagement of the roller 100, journaled in the tool bearing 67, (Fig. 5), with the pattern 22 secured to the table.

The tool supporting arbor 101 (Fig. 4) is supported at its lower end in the bearing 67, and the cutting tool 66 is clamped to the spindle by a nut 102, at the lower end of the spindle and serving to force the tool against the shoulder 103 thereon.

This shoulder is recessed at 104 to engage tongues 105 projecting downwardly from the motor shaft 106. The latter is hollow and shaped at its lower end to receive the tapered upper end 107 of the tool spindle or arbor 101, which is tightly drawn into the motor shaft by a bolt 108 passing downwardly therethrough and threaded into the tool spindle. When the cutting tools 66 are removed or replaced, the bearing 67 is first taken out of the way after removing clamping strip 70', Fig. 6. The bearing 67 is vertically adjustable in the guide 68 and will therefore fit tool arbors of varying length and bring the roller 100 to a higher or lower position. Thus the roller of one cutting unit may be higher than the roller of another cutting unit and engage a different portion of pattern 22 or a different pattern superimposed thereon. Thus a convenient means is provided for controlling the cutting units independently for performing different work.

The tool operating motors 65 are reversible, and the tool arbors 101 and clamping units 102 accordingly are made with either right or left threads.

In the operation of the automatic shaper, the tools 66 are driven at constant speed by the motors 65 and the cutting units are resiliently urged radially toward the center of the table and at any desired pressure, by compressed air within the cylinders 97. Air is admitted and released from the cylinders by suitable control valves in the supply line. The ram 69 is firmly guided by the adjustable guide rollers within the supporting guide 80 for the ram.

The articles of work operated upon are supported on the table 3 above the pattern 22 and, as the table rotates, articles placed thereon are automatically adjusted to the proper position, for engagement by the tools, by the pneumatic work adjusting grips 28 which serve to draw such articles inwardly against stops, in which position they are then firmly gripped by the clamps 27.

The successive operation of the gripping devices and the clamps is controlled by the valve structure centrally located on the work supporting table 3, the elements of this valve as previously described being adjustable to effect the desired time of action of the work adjusting and clamping means.

The table 3 rotates at varying speeds according to the placing of cams 16 (Fig. 3) thereon which, through the roller 18 and its linkage to the brushes of the motor shifts the brushes and changes the speed of the motor. Rotation of the table may be stopped at any time by operating lever 55 which controls the clutch 12 in the drive for the table. This clutch may likewise be disengaged by the actuation of levers 57 or 58.

While but one specific embodiment of this invention has been herein shown and described, it will be understood that details of the construction shown may be altered or omitted without departing from the spirit of this invention as defined by the following claims.

I claim:

1. An automatic shaper comprising a supporting base, a work supporting table mounted thereon for rotation on a vertical axis, means for driving said table, a tool carrying unit, supporting and guiding means for said unit mounted upon the supporting base, means for effecting vertical adjustment of the tool unit supporting and guiding means, said tool unit being horizontally shiftable along the guide means, and including a pneumatic ram for shifting the tool carrying unit, said supporting and guiding means for the tool carrying unit being provided with pivoted guide roller carrying arms extending in opposite directions from their pivots, and means for adjusting said arms toward said ram.

2. An automatic shaper comprising a supporting base, a work supporting table mounted thereon for rotation around a vertical axis, a tool carrying unit comprising a head, a motor mounted in said head, a shaft in said motor having means for attachment thereto of a tool, a bearing for the end of the tool, said bearing being mounted in said head for movement toward and away from the end of the tool, supporting and guiding means for said tool carrying unit, and pneumatic means for urging said tool carrying unit over the top of the work supporting table.

3. An automatic shaper comprising a supporting base, a work supporting table mounted thereon for rotation around a vertical axis, a tool carrying unit comprising a head, a motor mounted in said head, a shaft in said motor having means for attachment thereto of a tool, a bearing for the end of the tool, said bearing being mounted in said head for movement toward and away from the end of said tool, a pattern engaging guide roller carried by said bearing, supporting and guiding means for said tool carrying unit, and pneumatic means for urging said tool carrying unit over the top of the work supporting table.

4. An automatic shaper comprising a supporting base, work supporting means rotatably mounted upon said supporting base, means for driving said work supporting means, a tool supporting unit mounted on said base for movement relatively to said work supporting means, means for pneumatically effecting the movement of the tool supporting unit relative to the work supporting means, comprising a cylinder carried by the tool supporting unit, and a supporting guide within said cylinder including means for admitting compressed air thereto.

5. An automatic shaper comprising a supporting base, a work supporting table mounted thereon for rotation on a vertical axis, a cam supported by the table on the periphery thereof and adjustable along the periphery of the table, driving means for said table, means cooperating with said cam for varying the speed of said driving means, and a tool supporting and driving unit mounted for movement over said table.

6. An automatic shaper comprising a supporting base, a work supporting table mounted on said base for rotation around a vertical axis, driving means for said table, means carried by said table for varying the speed of said driving means, a tool supporting unit mounted for radial motion over the top of said table including a separate motor drive therefor, and pneumatic means for resiliently urging the said unit toward the center of the table.

7. An automatic shaper comprising a supporting base, a work supporting table mounted on said base for rotation around a vertical axis, driving means for said table, a tool carrying unit mounted upon the base for motion over the top of said table, pneumatic means for gripping articles to be operated upon and positioning said articles on the table, a pneumatic clamp for rigidly retaining articles upon the table, a valve mechanism centrally located on the table and having conduit connections to said work gripping and clamping devices, said valve mechanism comprising a centrally fixed core having connections for receiving a supply of fluid under pressure and ports for the delivery of fluid to said work positioning and clamping devices, cooperating valve elements rotatably mounted upon said core and rigid with said table and provided with ports for controlling the time of delivery of fluid under pressure to the work positioning and gripping devices, and means for effecting a relative adjustment between said cooperating valve elements.

8. An automatic shaper comprising a supporting base, a work supporting table mounted on said base for rotation around a vertical axis, driving means for said table, a tool carrying unit mounted upon the base for motion relatively to said table, a valve structure carried at the center of the table, said valve structure comprising a central core having passageways and ports therein, means for admitting compressed air to said passageways, a valve body surrounding said core and carried by said table, pneumatic work positioning and clamping means carried by said table and having conduit connections with said valve body.

9. An automatic shaper comprising a supporting base, a work supporting table mounted upon said base for rotation around a vertical axis, driving means for said table, a tool carrying unit mounted upon said base for motion relatively to said table, pneumatic work positioning and clamping devices carried by said table, a valve structure operable in unison with said table for controlling the actuation of said work positioning and clamping devices, said valve structure including relatively movable elements arranged for the admission and release of compressed air to and from the pneumatic work positioning and clamping devices.

Signed at Chicago this 29th day of December, 1930.

OSCAR ONSRUD.